US005723416A

United States Patent [19]

Liao

[11] Patent Number: 5,723,416
[45] Date of Patent: Mar. 3, 1998

[54] WELL SERVICING FLUID FOR TRENCHLESS DIRECTIONAL DRILLING

[76] Inventor: W. Andrew Liao, 3634 Mill Bridge Way, Kingwood, Tex. 77345

[21] Appl. No.: 831,359

[22] Filed: Apr. 1, 1997

[51] Int. Cl.$^6$ .................. C09K 7/00; C09K 7/02
[52] U.S. Cl. .................. 507/110; 507/141; 507/145
[58] Field of Search .................. 507/110, 141, 507/145, 213, 276, 277, 209

[56] References Cited

U.S. PATENT DOCUMENTS

| | | | |
|---|---|---|---|
| 2,433,668 | 12/1947 | Jones | 507/141 |
| 4,242,140 | 12/1980 | Alther | 507/140 |
| 4,267,062 | 5/1981 | Byerley | 507/141 |
| 4,439,328 | 3/1984 | Moity | 507/141 |
| 4,634,538 | 1/1987 | Alexander | 507/110 |
| 4,647,859 | 3/1987 | Son et al. | 507/141 |
| 4,743,384 | 5/1988 | Lu et al. | 507/110 |
| 5,165,479 | 11/1992 | Harris et al. | 507/110 |
| 5,305,832 | 4/1994 | Gupta et al. | 507/110 |
| 5,330,015 | 7/1994 | Donche et al. | 507/110 |

*Primary Examiner*—Philip Tucker
*Attorney, Agent, or Firm*—Browning Bushman

[57] ABSTRACT

Disclosed is a composition comprising a water swellable clay, and particularly a sodium montmorillonite clay such as bentonite, sodium carbonate, and a water-soluble biopolymer, and particularly a xanthan biopolymer. The composition when mixed with fresh water forms an aqueous drilling mud having the desirable fluid properties including a high gel strength profile of 10-second/10-minute/30-minute gel and a low API fluid loss for use in trenchless directional drilling including mini-horizontal directional drilling, guided boring, auger boring, pipe jacking, microtunneling, and river crossing. The composition mixed with an aqueous medium provides a water-based drilling mud applicable to trenchless directional drilling in an unconsolidated formation and particularly in an environment contaminated with salty water such as sea water. The composition contains a mixture of about 91 to 98% by weight of Wyoming bentonite, about 1 to 8% by weight of carbonate salt of alkali metal, and about 0.5 to 4% by weight of a selective xanthan biopolymer.

12 Claims, No Drawings

WELL SERVICING FLUID FOR TRENCHLESS DIRECTIONAL DRILLING

FIELD OF THE INVENTION

The present invention relates to a composition, when mixed with an aqueous medium, to form a water based drilling mud for use in boring a hole underground. More particularly, the invention is direct to a drilling mud having the specific characteristics most suitable for mini-horizontal directional drilling, guided boring, auger boring, microtunneling, and pipe jacking to install small diameter utility pipes, cables, large diameter sewer line, and crossings. In its more specific aspects, the invention is directed to the drilling mud applicable not only in an uncontaminated environment but in an environment contaminated with high salinity such as sea water.

BACKGROUND OF THE INVENTION

A water-based drilling mud containing finely divided bentonite clay particles and other additives, including both organic and inorganic compounds in an aqueous medium, is frequently used in the rotary method of drilling a borehole underground, either vertically or horizontally. The drilling mud is pumped down the drill stem through the openings in the drill bit and upwardly, through the annual space between the drill stem and the wall of the borehole, to the surface of the earth. One of the primary benefits of employing the drilling mud is to suspend the cuttings produced by the drill bit during the boring process and to transport these cuttings to the surface of the earth. To keep the drilled hole open, the cuttings have to be removed from the drilled borehole. The drilling mud exhibiting certain fluid characteristics will achieve the objective. Another important function of the drilling mud is to provide a thin and impermeable filter cake on the wall of the borehole to reduce loss of water from the borehole to the formation. Water infiltration from the drilling mud to the surrounding formation causes the formation to soften, which further induces borehole sloughing and cave in. Other advantages of drilling mud include lubricating the bit and the drill stem, cooling the bit, reducing torque and drag, and providing a hydrostatic pressure head to prevent formation fluid from flowing into the borehole. A desirable drilling fluid for the rotary method of boring a hole underground should exhibit adequate viscosity and sufficient gel strength to suspend the cuttings and clean the borehole, and the fluid loss low enough to prevent the loss of water from the drilling mud to the surrounding formation inhibiting the drilled borehole from collapsing.

Although the basic requirements of a drilling mud for boring either a vertical or a directional hole are the same, some of these functions become more critical in boring a directional hole; particularly horizontal. Gel strength and fluid loss are the two most important requirements of a drilling mud being used in mini-horizontal directional drilling and microtunneling. Gel strength is defined as the measurement of the drilling mud's ability to support suspended cuttings when fluid is at rest. The procedure used to measure drilling mud gel strength is based on the American Petroleum Institute (API) Recommended Practice 13B-(RP 13B-1) Section 2-Viscosity and Gel Strength. A drilling mud should have sufficient gel strength in order to keep cuttings from settling. If a drilling mud does not exhibit an adequate gel strength, cuttings in the drilling mud tend to settle out which many result in sliding cuttings beds, which can also cause drill pipe to stick or even cause total loss of the hole.

In the article entitled "How To Select Drilling Fluids For Horizontal Wells", published in WORLD OIL®, May 1993 (page 59 to 68), Lindsey J. Fraser described the fact that suspension capability of a drilling mud for use in drilling horizontal wells is as critical as hole cleaning and that more serious problems may arise in the tangent than in the horizontal section. Gel strength typically of a drilling mud varies with time. The value depends on how long the drilling mud has been at rest. Gel strength is a function of time. Therefore, it is necessary to describe gel strength with the time when the measurement is taken; for example, 10-second gel, 10-minute gel and 30-minute gel. In general, the gel strength of a drilling mud increases steadily with time until it reaches the plateau. A two point gel strength measurement (10-second and 10-minute gel) is frequently used to predict if a drilling mud used for boring a vertical hole can suspend cuttings efficiently. A three point gel strength measurement, which includes 30-minute gel in addition to 10-second gel and 10-minute gel, is needed to obtain a gel strength profile in order to predict the efficiency of cuttings suspension of a drilling mud used for boring a directional, horizontal hole.

Another requirement of a drilling fluid for boring any hole, either vertically or directionally, is a low fluid loss or filtration rate as referred to in the oil and gas well drilling industry. A drilling mud may have sufficient gel strength to prevent settling of cuttings from the mud when circulation of the mud is stopped. However, if the drilling mud does not have a low filter loss, it may results in the deposition of a thick filter cake on the borehole's walls, which may cause instability of the borehole. When large amounts of water filter from the drilling mud into the formation surrounding the borehole, the solids of the mud remain as a filter cake on the wail of the hole, reducing the size of the annular passage. Built-up of a thick filter cake may cause the drill pipe to become stuck. The tendency for a drill pipe to get stuck due to high filter loss of the drilling mud is more likely to occur when boring a hole horizontally rather than vertically. A drilling mud with low fluid loss is essential for boring a horizontal hole, particularly in an unconsolidated formation, such as silt or sandy soil, to prevent the borehole from caving in. In the article entitled "Fluid Loss Is Key In Drilling Highly Deviated Wells", published in *Petroleum Engineer International*, February, 1988 (pages 24 to 26), B. Byrd and M. Zamora described the important of filtration control to minimize formation damage particularly in drilling highly deviated wells. Fluid loss is measured by the API Recommended Practice 13B-1 Section 3-Low Temperature/Low Pressure Filtration Test Procedure. A drilling fluid having a low filtration rate only allows a small amount of water to diffuse from the mud to the formation surrounding the borehole under the pressure differential prevailing in the borehole.

An effective drilling mud is often prepared by mixing a finely divided sodium-based bentonite clay with fresh water. Once the clay particles hydrate and swell in fresh water, the resultant clay slurry provides proper density, viscosity, gel strength, and fluid loss control for use in drilling wells. However, the desirable properties will diminish when the drilling mud is in contact with salty water or contaminants containing high concentration of inorganic electrolytes, such as sodium chloride or potassium chloride, and particularly salts of calcium and magnesium. The inorganic salts can reduce the effectiveness of diffusion double layer (Gouy-Chapman theory) of partially bound water surrounding the hydrated bentonite clay particles, thus reducing the effective size of the clay particles. As the salinity of water increases, the yielding or swelling ability of bentonite rapidly decreases. As the salinity of the water approaches the seawater level, the bentonite becomes inert, providing no advantages for use in a drilling mud. Seawater, which contains high concentrations of electrolytes, including chloride (18,970 parts per million or ppm), sodium (16,550 ppm), calcium (400 ppm), and magnesium (1,270 ppm), can be detrimental to the drilling mud containing sodium bentonite. Martin Chenevert and Adam Bourgoyne, Jr., et al detailed the effect of saline water, containing various amounts of sodium chloride, on the apparent viscosity of a 20 pounds per barrel Wyoming sodium bentonite slurry in Applied Drilling Engineering published by Society Petroleum Engineers (SPE), 1991, Chapter 2, Section 4.3 (page 74 to 75): High-Salinity Muds. The immediate adverse effect of a drilling mud contaminated with sea water is the loss of filtration control. The fluid loss increases drastically and the thickness of the wall cake also increases due to flocculation of the drilling fluid. Accumulation of the wall cake on the borehole due to the loss of filtration control of the drilling mud could hamper the mini-directional horizontal drilling operation, particularly when pulling the pipes, such as large diameter steel or PVC pipes. They tend to get stuck in the high angle section of the hole if the passageway is partially blocked. A fluid control agent is often added to the drilling fluid to mitigate the adverse effect of sea water contamination on the drilling mud's rheological properties.

U.S. Pat. No. 4,634,538 issued to William Alexander describes a composition combining a water swellable clay, particularly montmorillonite clay such as bentonite, xanthan gum, and one or more additional water-soluble gums for use as a drilling mud in rotary drilling and as a lagoon and landfill sealant. The prior art discloses the xanthan gum together with one or more additional water-soluble gums to prevent the montmorillonite clay composition from substantial coagulation or flocculation upon contact with salt-contaminated water and high saline water. The prior art also discloses a method of rotary drilling, including the step of circulating a bentonite composition within the drill hole as a rotary drilling fluid additive to seal an earth formation surrounding the drill hole, and a method of holding water, such as in a lagoon bottom or landfill surface, by adding the bentonite composition to an earth surface of the lagoon or landfill. The prior art does not provide an acceptable method for boring a borehole underground, particularly in mini-horizontal directional drilling, guided boring, auger drilling, microtunneling, pipe jacking, and crossings. The addition of one or more water-soluble gums may stabilize a drilling fluid containing water swellable bentonite clay; however, the resultant slurry or mud is not necessarily suitable for use in the above specific drilling applications for which the composition of the present invention is particularly suitable.

U.S. Pat. No. 4,267,062 issued to Thomas Byerley describes a composition containing a water-swellable clay gallant such as sodium montmorillonite, a water-soluble alkali metal salt such as sodium carbonate and a water-soluble, non-hygroscopic salt of carboxymethyl cellulose. The composition of the prior art when mixed with fresh water forms an aqueous slurry as a sealant for sealing abandoned boreholes. This art does not disclose a drilling application such as mini-horizontal directional boring and microtunneling to which the present invention is most applicable. This art does disclose that the composition after being mixed with fresh water forms an aqueous slurry having certain fluid rheological properties suitable for the application. However, in Example 1, Table 1 shows the effect of sea salt contamination on two drilling muds prepared from the prior art and the present invention respectively. The data shows a large increase of API fluid loss of the aqueous slurry prepared by the prior art, when the slurry is contaminated with sea salt. The loss of desirable fluid properties of the prior art is due to the carboxymethyl cellulose in the composition of the prior art losing its effectiveness in stabilizing the clay slurry, when the slurry is contaminated with the water containing high salt concentration.

Accordingly, there has been a need for a composition, which when mixed with an aqueous medium, forms a water based drilling mud which is effective not only in an uncontaminated environment but also in an environment contaminated with high concentration of electrolytes such as salty water, and which still maintains desirable fluid rheological properties such as low API fluid loss and high gel strength profile even in the presence of sea water, and which is particularly applicable as a drilling mud for mini-horizontal directional drilling, guided boring, auger boring, microtunneling and pipe jacking to install small diameter utility pipes, cables, large diameter sewer line, and river crossings.

SUMMARY OF THE INVENTION

It is therefore an objective of the present invention to provide a composition, when mixed with an aqueous medium, to provide a water-based drilling mud for use in trenchless directional drilling applications.

Another objective of the present invention is to provide a drilling mud for use particularly in guided boring, mini-horizontal directional drilling, and auger boring to aid installation of small diameter utility lines such as PVC and steel pipes, telephone lines, optical cables, and telecommunication cables, and in microtunneling and pipe jacking to aid installation of sewer lines, and in river crossing to aid installation of large diameter pipelines.

Still a further objective of the present invention is to provide a drilling mud with the desirable properties such as high viscosity, high gel strength profile with respect to time, especially 30-minute gel and low filtration rate for use in the specific drilling applications as stated previously.

Yet a further objective of the present invention is to provide a drilling mud for use to drill wells not only in an uncontaminated formation but also in a contaminated environment, for example sea water and brackish water invasion. The drilling mud prepared from the composition of the present invention maintains the desirable fluid rheological properties when the drilling fluid is in contact with sea water.

Another objective of the present invention is to provide a composition containing finely divided water-swellable sodium bentonite clay which is modified with a biopolymer such as xanthan biopolymer, and carbonate of alkali salt.

Still another objective of the present invention is to provide a composition containing a selective biopolymer such as xanthan biopolymer as an anti-settling agent such that the drilling mud maintains high gel strength for suspending unconsolidated cuttings even when the drilling is in contact with salty water such as sea water or brackish water.

The above and other objectives of the present invention will become apparent from the description given herein and the appended claims.

The water-swellable clay gellant is selected form the class comprising natural and synthetic versions of sodium-based bentonite, calcium-based bentonite, montmorillonite, beidellite, hectorite, saponite, stevensite, and mixtures thereof: and the water swellable biopolymer is selected from the class comprising natural and modified xanthan gum, welan gum, guar gum, dextran gum, locust bean gum, and mixtures thereof.

In one embodiment, the present invention comprises a finely divided, water-swellable sodium bentonite clay such as Wyoming type montmorillonite, an alkali metal carbonate such as sodium carbonate, and a biopolymer such as xanthan biopolymer.

In another embodiment of the present invention, the composition when mixed with fresh water, provides a water-based drilling mud suitable for trenchless horizontal drilling applications in both consolidated and unconsolidated formations due to the drilling mud having the desirable fluid properties such as high viscosity, high gel strength, and low fluid loss.

In yet another embodiment of the present invention, the drilling mud prepared from the composition containing an anti-settling xanthan biopolymer, sodium carbonate and finely divided sodium bentonite clay is effective for use in drilling through a formation contaminated with or invaded by salty water such as sea water or brackish water.

DESCRIPTION OF THE PREFERRED EMBODIMENT

The composition of the present invention preferably contains a water swellable montmorillonite clay, primarily a water swellable sodium bentonite in an amount of from 91 to 98 percent by weight; carbonate salt of alkali metals such as sodium carbonate and potassium carbonate in an amount from 1 to 8 percent by weight; and an anti-settling agent such as an xanthan type of biopolymer in an amount of 0.5 to 4 percent by weight. The composition of the present invention when mixed with an aqueous medium provides a drilling mud suitable for mini-horizontal directional drilling and other trenchless horizontally boring applications. One 50 pound sack of this composition is mixed directly with about 100 gallons freshwater to make a 20 pound per barrel (20 lb/bbl) drilling mud with the desirable fluid rheological properties most suitable for trenchless horizontally drilling applications in clean, uncontaminated zones where sea water or salty water invasions may occur. Those desirable fluid properties include a yield point no less than 20 pounds per 100 square feet (20 lb/100 sq. ft.), a gel strength profile, i.e. 10 second/10 minute/30 minute gel expressed in pounds per 100 square feet, no less than 15/25/32.. and an API filter loss no greater than 15 milliliters per 30 minutes filtration time (15 ml/30 min.) Trenchless horizontal directional drilling requires a drilling mud with a high yield point and a high gel strength profile for suspending cuttings or spoils effectively to keep the borehole clean, and a low API filter loss to prevent drilling fluid from invading the surrounding formation, thus further keeping the borehole open and free from sloughing. An anti-settling agent like the one incorporated in the composition of the present invention aids in providing the drilling mud with those desirable fluid rheological properties. The effect of biopolymer in drilling fluid for horizontal well drilling is described in an article entitled "Biopolymer Fluids Eliminate Horizontal Well Problems", M. Seheult, L. Grebe II, J. E. Traweek, Jr. and M Dudly; published in *World Oil* ®, January, 1990. Furthermore, another unique feature of a 20 lb/bbl of the drilling mud prepared from the composition of the present invention involves the fact that with the addition of 15 lb/bbl sea salt (A aqueous solution containing 15 lb/bbl sea salt is equivalent to the composition of sea water), the drilling mud still maintains the fluid rheological properties satisfactory for trenchless horizontal directional drilling. One 50-pound sack of the composition is first mixed with 100 gallons fresh water to make a 20 lb/bbl drilling mud. Then a dry sea salt in an amount of 35.7 pounds is added to the drilling fluid to simulate the situation occurring when the drilling mud is contaminated with salty water such as sea water. The rheological properties include a yield point no less than 20 lb/100 sq. ft., a gel strength profile, i.e. 10 second/10 minute/30 minute gel no less than 15/25/30, and an API fluid loss no greater than 34.5 ml/30 rain which is a 130 percent increase as compared to that in a freshwater based drilling mud. Commonly, percent increase in API fluid loss for a freshwater based drilling mud when contaminated with 15 lb/bbl sea salt is greater than 200 percent, if the freshwater-based drilling mud does not contain an effective fluid loss control agent or an anti-settling agent such as the one described in the present invention.

The preferred water swellable clay in the composition is a sodium-based bentonite containing no less than 85 percent sodium montmorillonite and having methylene blue capacity (MBC) value of above 70 milliequivalent per 100 grams of clay. MBC value is determined by the procedure recommended by the American Petroleum Institute (API): API Recommended Practice 131 (RP13I) Section 9 for Methylene Blue Capacity of Commercial Bentonite. The preferred clay particle size distribution should be at least 75 percent of clay particles small enough to pass through a 200 mesh U.S. standard sieve. The preferred sodium bentonite clay is preferably not treated by any chemical. The preferred amount of water swellable sodium-based bentonite clay in the composition of the present invention is in a range of 94 to 97 percent by weight.

The composition also contains an alkali metal carbonate such as sodium carbonate or potassium carbonates; sodium carbonate being preferred. The important function of the sodium carbonate incorporated with the water swellable clay in the composition is to induce flocculation of the clay particles to some extent but not fully while water swollen clay particles begin to hydrate when mixed with fresh water. The resulting clay slurry with most of the clay particles in their flocculated state shows a significant increase in gel strength and yield point. Both properties are the indication of the effectiveness of the drilling mud in suspending cuttings. However, excess of sodium carbonate in the drilling mud causes the drilling mud to become pasty, indicating excessive flocculation of the hydrated clay particles. Once the drilling mud is fully flocculated, it loses the ability of preventing the fluid from invading the formation surrounding the drilling borehole. As result of flocculation, the API fluid loss of the drilling mud increases drastically. A drilling mud with a high API fluid loss is detrimental to any drilling, particularly in directional wells. Therefore, a proper amount of sodium carbonate in the composition of the present invention is critical. The preferred amount of sodium carbonate in the composition of the present invention is in a range of 2 to 4 percent by weight.

A biopolymer incorporated in the composition of the present invention is for effective cutting transport, especially in curve and horizontal sections of drilling a horizontal directional well. In the horizontal section, turbulent flow has been proposed as the ideal flow profile for cuttings transport. In many cases, however, turbulent flow may not be possible due to limited pump rates, pipe electricity, or hole enlargement, which reduces annular velocity. In addition, turbulent flow may not be desirable where unstable hole conditions exist, including unconsolidated or severely fractured formations. To achieve turbulent flow at typical annular velocities requires a low viscosity fluid. During non-circulating periods, however, low viscosity fluids allow cuttings to settle rapidly. In the horizontal section, this can be detrimental. The settled cuttings or solids tend to move along the bottom of the hole as waves or dunes. This solid build-up can result in increased torque, drag, and the inability to transfer to the bit. In addition, it can lead to erratic pipe movement and sudden changes in hole direction. To prevent solid build-up during non-circulating periods requires high suspension properties, measured at extremely low shear rates such as 10-second, 10-minute, 30-minute gel strength profile. Several biopolymers tested show varying degree of improvement in cuttings suspension. The biopolymer selected for the composition of the present invention is based upon the evaluation criteria in the study. The preferred biopolymer is a highly refined completion grade xanthan biopolymer such as XANVIS manufactured by Kelco Oil Field Group. Unlike most synthetic polymers with linear molecular structure, the biopolymer selected when mixed with water creates viscosity through a network of polymer-on-polymer chains. The network or branched molecular structure of the xanthan biopolymer attributes to excellent cuttings suspension characteristics. This superior suspension due to the macromolecular interaction with cuttings is essential to keep the borehole open, particularly in curve and horizontal sections of a directional borehole.

Some of the synthetic linear polymers such as polyacrylamide and co-polymer of polyacrylamide, and cellulosic polymers such as polyanionic cellulose (PAC) and carboxymethyl cellulose (CMC) with linear molecular structures have the tendency of shrinking when the polymer slurries are contaminated with salty water. Because of shrinkage of the linear polymer the polymer slurry viscosity reduces simultaneously. The xanthan biopolymer such as XANVIS having a molecular structure similar to tree branches is not affected dramatically by salt such as sea salt contamination. Therefore, the effect of salt contamination or sea water invasion on the cutting suspension capability of the drilling mud containing XANVIS and sodium carbonate is insignificant. The XANVIS should be incorporated into the water swellable clay and sodium carbonate in an amount in the preferred range of 1 to 2 percent by weight.

The composition of this invention is prepared by conventional dry blending procedures. The order of addition is not critical, however, it is advisable to obtain a homogeneous admixture by blending the biopolymer and sodium carbonate into the water swellable clay.

The following examples are given to illustrate the invention but are not deemed to be limiting thereof. All percentages given are based upon weight unless otherwise indicated. All measurements were performed in accordance with the American Petroleum Institutes Recommended Practice Standard Procedure for Field Testing Water-Based Drilling Fluids identified as API Recommended Practice 13B-1 (RP 13B-1) First Edition, Jun. 1, 1990.

EXAMPLE 1

Runs 1 to 16

The composition of the present invention was prepared by blending 95% Wyoming sodium bentonite (200 mesh size), 4% sodium carbonate (powder), and 1% of an anti-settling agent selected from the following compounds respectively.

| Trade Name | Chemical Composition | Manufacturer |
| --- | --- | --- |
| Cellex ® | Sodium salt of carboxymethyl cellulose (CMC) | Baroid Drilling Fluids, Inc. (Houston) |
| BIOZAN ™ | biopolymer | Kelco Oil Field Group (Houston) |
| CAT-HI ™ | modified cellulosic polymer | Baroid Drilling Fluids, Inc. (Houston) |
| PAC-R ™ | polyanionic cellulose | Baroid Drilling Fluids, Inc. (Houston) |
| XANVIS ™ | xanthan biopolymer | Kelco Oil Field Group (Houston) |
| BARAZAN ® | biopolymer gum | Baroid Drilling Fluids, Inc. (Houston) |
| FILTER-CHEK ™ | modified starch | Baroid Drilling Fluids, Inc. (Houston) |
| LOLOSS ® | guar gum | Baroid Drilling Fluids, Inc. (Houston) |

The percent weight distribution of the three components in each formulation remains the same; the only difference in the compositions tested is the anti-settling agent chosen. Two 20 lb/bbl of the drilling mud were prepared by mixing 20 pounds of each composition with one barrel (42 U.S. gallons) of fresh water to provide a homogeneous clay slurry. One of the two slurries was contaminated with salty water by adding 15 pounds of dry sea salt to one barrel of the clay slurry. A 15 lb/bbl of sea salt aqueous solution is equivalent to natural sea water. The rheological properties of both drilling muds containing 20 lb/bbl of the same composition, except one in fresh water (uncontaminated) and the other one in sea water (contaminated), were measured using the API recommended test procedures. Table 2 and 3 list the test results. Each composition was tested in two runs with and without sea salt addition. Runs 1 to 16 involved eight (8) compositions with eight different anti-settling agents. Runs 10-1 and 10-2 are duplicates which were tested independently to ensure the precision of the experimental procedures.

EXAMPLE 2

The test results indicate the slurry made from each composition, containing mainly sodium bentonite, became flocculated after addition of sea salt. The rheological properties of the slurry were also affected by sea salt addition. Among those properties changed as a result of flocculation, three properties which changed most profoundly are: increase of API fluid loss, increase of yield point, and decrease of 30-minute gel strength. Naturally, these three fluid properties can be used as criteria for screening an effective anti-settling agent to be incorporated in the composition of the present invention such that the drilling mud can maintain those desirable characteristics even in a contaminated environment. However, yield, correctly referred to as Bingham yield value, measures the stress required to move the drilling fluids which are Newtonian fluids. Yield point which is normally obtained by the direct-indicating viscometer such as FANN 35A by subtracting the plastic viscosity from the 300-rpm reading is not adequately applicable to the drilling fluids containing polymers, especially those polymers exhibiting high gel strength. Because of that, a change in yield point of the drilling mud containing polymers after addition of sea salt does not infer a change in cutting suspension capability of the drilling mud. Therefore, it cannot be used as one of the criteria. The other two fluid properties, i.e., API fluid loss and 30-minute gel strength, should be used as screening criteria for choosing the most effective anti-settling agent for the composition of the present invention.

Two quantities by calculation used as screening criteria are: Criterion I-percent increase of API fluid loss and Criterion II- percent decrease of 30-minute gel strength of the drilling mud before and after addition of sea salt.

EXAMPLE 3

Among the compositions tested, the most desirable composition would be the one which provides the drilling mud with the lowest number of percent decrease in 30-minute gel strength after the drilling mud was mixed with 15 lb/bbl sea salt. The acceptable anti-settling agent should meet the specific percent set for both criteria: the criterion I of less than 135 percent and the criterion II of less than 45 percent.

Table 4 lists the percent changes in both criteria of each composition tested. The data shows that BARAZAN, BIOZAN, and XANVIS meet both criteria. These three products are biopolymers available from Baroid Drilling Fluids, Inc. of Houston, Tex. XANVIS is a xanthan gum biopolymer. They all provide the drilling mud with adequate suspension capability in uncontaminated and contaminated environments; however, XANVIS is most preferable. Therefore, the XANVIS biopolymer was selected as the preferred anti-settling agent in the composition of the present invention. The composition comprising water swellable sodium bentonite, sodium carbonate and the XANVIS biopolymer, when mixed with fresh water, provides a drilling mud which is least affected by sea water contamination.

EXAMPLE 4

Runs 17 to 27

It is important to optimize the weight percent distribution of each component in the composition of the present invention to obtain the maximum effectiveness of the drilling mud for the specific drilling applications. Since there are three components in the composition, the process of optimization is to keep the weight percent of one of the three components constant and vary the weight percent distribution of the other two components.

The first optimization was conducted by keeping sodium carbonate at a constant of 4 percent by weight, and varying the weight percent distribution between Wyoming bentonite and XANVIS. The total weight percent of the three components should be equal to 100 percent. Table 5 (Runs 17 to 26) lists the first optimization results. The data indicates the optimum weight percent range for Wyoming bentonite is from 94 to 95.5 percent, and for XANVIS the range should be from 1 to 2 percent.

EXAMPLE 5

Runs 27 to 36

The second optimization was proceeded by keeping weight percent of XANVIS at a constant of 1 percent and varying the weight percent distribution between Wyoming bentonite and sodium carbonate. Table 6 (Runs 27 to 36) lists the second optimization results. The data indicates the optimum weight percent range for Wyoming bentonite is from 94 to 97 percent, and for sodium carbonate the range is from 2 to 4 percent.

The results from both optimization runs concludes that the optimum weight percent ranges of each component in the composition of the present invention are: 94 to 97 percent of Wyoming sodium bentonite, 2 to 4 percent of sodium carbonate, and 1 to 2 percent of XANVIS.

TABLE 1

COMPARISON OF RHEOLOGICAL PROPERTIES OF THE DRILLING MUDS PREPARED FROM THE PRIOR ART (U.S. PAT. NO. 4,267,062) AND THE PRESENT INVENTION IN FRESH WATER WITH AND WITHOUT SEA SALT CONTAMINATION

| Formulation | Prior art | | Present invention | |
|---|---|---|---|---|
| Wyoming bentonite (untreated), wt % | 95.0 | | 95.0 | |
| Sodium carbonate, wt % | 4.0 | | 4.0 | |
| Sodium carboxymethyl cellulose (WP), wt % | 1.0 | | — | |
| Anti-settling agent (biopolymer), wt % | — | | 1.0 | |
| Slurry preparation: | To 1 barrel of fresh water, add 20 pounds of each blend product, and shear for 20 minutes using Hamilton WP. | | | |
| Slurry, lb/bbl | 20 | 20 | 20 | 20 |
| Sea salt, lb/bbl | — | 15 | — | 15 |
| After added sea salt the slurry was mixed for 10 minutes. | | | | |
| Rheological properties | | | | |
| Plastic viscosity, cP | 11 | 5 | 14 | 10 |
| Yield point, lb/100 ft+e,cir +ee 2 | 17 | 34 | 25 | 31 |
| Gel strength lb/100 ft+e,cir +ee 2 | | | | |
| 10 second gel | 24 | 21 | 32 | 25 |
| 10 minute gel | 43 | 27 | 56 | 36 |
| 30 minute gel | 51 | 28 | 65 | 40 |
| Filtrate (API), ml/30 min | 10.5 | 38 | 10.5 | 22 |

TABLE 2

| Formulation | #1 | #2 | #3 | #4 | #5 | #6 | #7 | #8 |
|---|---|---|---|---|---|---|---|---|
| Wyoming bentonite, wt % | 95 | 95 | 95 | 95 | 95 | 95 | 95 | 95 |
| Sodium carbonate, wt % | 4 | 4 | 4 | 4 | 4 | 4 | 4 | 4 |
| Anti-setting agent | CELLECX | CELLEX | BIOZAN | BIOZAN | CAT-HI | CAT-HI | | |
| Amount added, wt % | 1 | 1 | 1 | 1 | 1 | 1 | 1 | 1 |
| Slurry preparation: To 1 barrel of fresh water, add 20 pounds of each blend product, and shear for 20 minutes using Hamilton Multimixer. | | | | | | | | |
| Slurry, lb/bbl | 20 | 20 | 20 | 20 | 20 | 20 | 20 | 20 |
| Sea salt, lb/bbl | — | 15 | — | 15 | — | 15 | — | 15 |
| Slurry rheological properties | | | | | | | | |

TABLE 2-continued

| Formulation | #1 | #2 | #3 | #4 | #5 | #6 | #7 | #8 |
|---|---|---|---|---|---|---|---|---|
| 600 rpm | 39 | 44 | 45 | 42 | 82 | 70 | 60 | 55 |
| 300 rpm | 28 | 39 | 34 | 34 | 60 | 62 | 46 | 48 |
| 200 rpm | 25 | 36 | 30 | 31 | 51 | 57 | 39 | 45 |
| 100 rpm | 21 | 33 | 25 | 27 | 40 | 52 | 33 | 41 |
| 6 rpm | 17 | 25 | 18 | 19 | 28 | 36 | 28 | 31 |
| 3 rpm | 16 | 24 | 17 | 18 | 27 | 23 | 27 | 29 |
| Plastic viscosity, cP | 11 | 5 | 11 | 8 | 22 | 8 | 14 | 7 |
| Yield Point, lb/100 ft$^2$ | 17 | 34 | 23 | 26 | 38 | 54 | 32 | 39 |
| 10 second gel, lb/100 ft$^2$ | 24 | 21 | 24 | 20 | 30 | 19 | 36 | 26 |
| 10 minute gel | 43 | 27 | 43 | 27 | 37 | 20 | 75 | 30 |
| 30 minute gel | 51 | 28 | 52 | 32 | 39 | 18 | 92 | 35 |
| API fluid loss, ml/30 min | 9.0 | 38 | 11.5 | 25.5 | 12.5 | 46 | 7.5 | 28 |

TABLE 3

| Formulation | #9 | #10-1 | #10-2 | #11 | #12 | #13 | #14 | #15 | #16 |
|---|---|---|---|---|---|---|---|---|---|
| Wyoming bentonite, wt % | 95 | 95 | 95 | 95 | 95 | 95 | 95 | 95 | 95 |
| Sodium carbonate, wt % | 4 | 4 | 4 | 4 | 4 | 4 | 4 | 4 | 4 |
| Anti-settling agent | XANVIS | XANVIS | XANVIS | BARAZAN | BARAZAN | FILTER-CHEK | FILTER-CHEK | LOLOSS | LOLOSS |
| Amount added, wt % | 1 | 1 | 1 | 1 | 1 | 1 | 1 | 1 | 1 |

Slurry preparation: To 1 barrel of fresh water, add 20 pounds of each blend product, and shear for 20 minutes using Hamilton a.

| | | | | | | | | | |
|---|---|---|---|---|---|---|---|---|---|
| Slurry, lb/bbl | 20 | 20 | 20 | 20 | 20 | 20 | 20 | 20 | 20 |
| Sea salt, lb/bbl | — | 15 | 15 | — | 15 | — | 15 | — | 15 |
| Slurry rheological properties | | | | | | | | | |
| 600 rpm | 53 | 51 | 51 | 46 | 45 | 34 | 37 | 74 | 74 |
| 300 rpm | 39 | 41 | 41 | 35 | 36 | 26 | 31 | 54 | 66 |
| 200 rpm | 36 | 38 | 37 | 31 | 32 | 23 | 29 | 48 | 62 |
| 100 rpm | 31 | 34 | 32 | 26 | 27 | 19 | 26 | 40 | 57 |
| 6 rpm | 27 | 24 | 22 | 20 | 19 | 15 | 19 | 32 | 38 |
| 3 rpm | 26 | 23 | 21 | 20 | 19 | 15 | 18 | 32 | 27 |
| Plastic viscosity, cP | 14 | 10 | 10 | 11 | 9 | 8 | 6 | 20 | 8 |
| Yield point, lb/100 ft$^2$ | 25 | 31 | 31 | 24 | 25 | 18 | 25 | 34 | 58 |
| 10 second gel, lb/100 ft$^2$ | 32 | 25 | 23 | 26 | 21 | 25 | 18 | 30 | 26 |
| 10 minute gel, lb/100 ft$^2$ | 56 | 36 | 30 | 39 | 27 | 45 | 22 | 39 | 30 |
| 30 minutes gel, lb/100 ft$^2$ | 65 | 40 | 39 | 47 | 30 | 54 | 30 | 46 | 30 |
| API fluid loss, ml/30 min | 10.5 | 22 | 22 | 10.5 | 22.5 | 10.5 | 41 | 12.5 | 30.5 |

TABLE 4

CRITERIA USED TO SCREEN ANTI-SETTLING AGENTS FOR THE PRESENT INVENTION

| Run No. | 1,2 | 3,4 | 5,6 | 7,8 | 9,10 | 11,12 | 13,14 | 15,16 |
|---|---|---|---|---|---|---|---|---|
| Polymer type | Cellulose | Biopolymer | Modified cellulose | Cellulose | Biopolymer | Biopolymer | Starch | Biopolymer |
| Trade name | CELLEX | BIOZAN | CAT-HI | PAC-R | XANVIS | BARAZAN | FILTER-CHEK | LOLOSS |
| Criterion I: Percent increase of API fluid loss after addition of sea salt | 322% | 122% | 268% | 273% | 110% | 114% | 291% | 144% |
| Criterion II: Percent decrease of 30-minute gel strength after addition of sea salt | 45% | 39% | 54% | 62% | 39% | 36% | 45% | 35% |

TABLE 5

OPTIMIZATION 1-VARIABLES: XANVIS & WYOMING BENTONITE; CONSTANT: SODIUM CARBONATE

| Formulation | #17 | #18 | #19 | #20 | #9 | #10 | #21 | #22 | #23 | #24 | #25 | #26 |
|---|---|---|---|---|---|---|---|---|---|---|---|---|
| Wyoming bentonite wt % | 95.5 | 95.5 | 95.25 | 95.25 | 95 | 95 | 94.5 | 94.5 | 94 | 94 | 92 | 92 |
| Sodium carbonate, wt % | 4.0 | 4.0 | 4.0 | 4.0 | 4 | 4 | 4.0 | 4.0 | 4 | 4 | 4 | 4 |
| XANVIS biopolymer, wt % | 0.5 | 0.5 | 0.75 | 0.75 | 1 | 1 | 1.5 | 1.5 | 2 | 2 | 4 | 4 |
| Slurry preparation: To 1 barrel of fresh water, add 20 pounds of each blend product, and shear for 20 minutes using Hamilton Multimixer. | | | | | | | | | | | | |
| Slurry, lb/bbl | 20 | 20 | 20 | 20 | 20 | 20 | 20 | 20 | 20 | 20 | 20 | 20 |
| Sea salt, lb/bbl | — | 15 | — | 15 | — | 15 | — | 15 | — | 15 | — | 15 |
| Slurry rheological properties | | | | | | | | | | | | |
| 600 rpm | 44 | 34 | 43 | 47 | 53 | 51 | 60 | 60 | 67 | 59 | 83 | 88 |
| 300 rpm | 33 | 28 | 33 | 39 | 39 | 41 | 45 | 48 | 50 | 48 | 63 | 73 |
| 200 rpm | 29 | 25 | 29 | 35 | 36 | 38 | 39 | 43 | 46 | 43 | 55 | 64 |
| 100 rpm | 24 | 22 | 25 | 31 | 31 | 34 | 34 | 37 | 39 | 37 | 46 | 54 |
| 6 rpm | 20 | 15 | 18 | 22 | 27 | 24 | 26 | 26 | 34 | 26 | 31 | 35 |
| 3 rpm | 19 | 14 | 17 | 21 | 26 | 23 | 25 | 25 | 32 | 25 | 31 | 33 |
| Plastic viscosity, cP | 11 | 6 | 10 | 8 | 14 | 10 | 15 | 12 | 17 | 11 | 20 | 15 |

TABLE 6

OPTIMIZATION 2-VARIABLES: SODIUM CARBONATE & WYOMING BENTONITE; CONSTANT: XANVIS

| Formulation | #27 | #28 | #29 | #30 | #9 | #10 | #31 | #32 | #33 | #34 | #35 | #36 |
|---|---|---|---|---|---|---|---|---|---|---|---|---|
| Wyoming bentonite, wt % | 98 | 98 | 97 | 97 | 95 | 95 | 94 | 94 | 93 | 93 | 91 | 91 |
| Sodium carbonate, wt % | 1.0 | 1.0 | 2.0 | 2.0 | 4.0 | 4.0 | 5.0 | 5.0 | 6.0 | 6.0 | 8.0 | 8.0 |
| XANVIS biopolymer, wt % | 1.0 | 1.0 | 1.0 | 1.0 | 1.0 | 1.0 | 1.0 | 1.0 | 1.0 | 1.0 | 1.0 | 1.0 |
| Slurry preparation: To 1 barrel of fresh water, add 20 pounds of each blend product, and shear for 20 minutes using Hamilton Multimixer. | | | | | | | | | | | | |
| Slurry, lb/bbl | 20 | 20 | 20 | 20 | 20 | 20 | 20 | 20 | 20 | 20 | 20 | 20 |
| Sea salt, lb/bbl | — | 15 | — | 15 | — | 15 | — | 15 | — | 15 | — | 15 |
| Slurry rheological properties | | | | | | | | | | | | |
| 600 rpm | 37 | 44 | 40 | 43 | 53 | 51 | 58 | 49 | 55 | 55 | 57 | 59 |
| 300 rpm | 26 | 36 | 28 | 34 | 39 | 41 | 45 | 40 | 44 | 46 | 44 | 48 |
| 200 rpm | 21 | 32 | 23 | 30 | 36 | 38 | 40 | 36 | 41 | 42 | 40 | 44 |
| 100 rpm | 17 | 28 | 18 | 26 | 31 | 34 | 35 | 32 | 35 | 37 | 36 | 39 |
| 6 rpm | 11 | 20 | 10 | 17 | 27 | 24 | 27 | 21 | 31 | 27 | 27 | 29 |
| 3 rpm | 10 | 10 | 10 | 17 | 26 | 23 | 26 | 21 | 30 | 26 | 27 | 29 |

What is claimed is:

1. A water-based drilling fluid useful for drilling through earth formations contaminated with electrolytes, comprising:

water; and a composition mixed into said water, said composition comprising about 91–98% by weight of a water-swellable clay gellant selected from the class of natural and synthetic versions of sodium-based bentonite, calcium-based bentonite, montmorillonite, beidellite, hectorite, saponite, stevensite and mixtures thereof;

about 1–8% by weight of a water-swellable alkali metal carbonate selected from the group consisting of sodium, potassium and mixtures thereof; and about 0.5–4% by weight of a water-swellable biopolymer selected from the class consisting of natural and modified xanthan gum, welan gum, guar gum, dextran gum, locust bean gum, and mixtures thereof.

2. The drilling fluid according to claim 1, wherein said composition mixed with the water comprises about 94–97% by weight of finely divided sodium bentonite, about 2–4% by weight of sodium carbonate and about 1–2% by weight of xanthan gum.

3. The drilling fluid according to claim 2, wherein said drilling fluid contains about 20 pounds of the composition per 42 gallon barrel of water.

4. The drilling fluid according to claim 3, wherein the constituents of the composition are all mixed together prior to mixing the composition with the water to form the drilling fluid.

5. The drilling fluid according to claim 3, wherein one or more of the constituents of the composition is mixed directly into the water without first being mixed with the remaining constituents of the composition.

6. A composition for mixing with water to form a water-based drilling fluid, comprising:
- about 91–98% by weight of a water-swellable clay gellant selected from the class consisting of natural and synthetic versions of sodium bentonite, calcium bentonite, montmorillonite, beidellite, hectorite, saponite, stevensite, and mixtures thereof;
- about 1–8% by weight of a water-swellable alkali metal carbonate selected from the class consisting of sodium, potassium, and mixtures thereof; and
- about 5–4% by weight of a water-swellable biopolymer selected from the class consisting of natural and modified versions of xanthan gum, welan gum, guar gum, dextran gum, locust bean gum, and mixtures thereof.

7. The composition according to claim 6, wherein said clay gellant comprises about 94–97% by weight of finely divided sodium bentonite.

8. The composition according to claim 7, wherein said alkali metal carbonate comprises about 2–4% by weight of sodium carbonate.

9. The composition according to claim 8, wherein said biopolymer comprises about 1–2% by weight of xanthan gum.

10. A method for drilling a horizontal well bore with a water-based drilling fluid comprising:
- mixing a composition to be added to water to form the water-based drilling fluid, said composition comprising:
- about 91–98% by weight of a water-swellable clay gellant selected from the class consisting of natural and synthetic versions of sodium bentonite, calcium bentonite, montmorillonite, beidellite, hectorite, saponite, stevensite, and mixtures thereof;
- about 1–8% by weight of a water-swellable alkali metal carbonate selected from the class consisting of sodium, potassium, and mixtures thereof;
- about 0.5–4% by weight of a water-swellable biopolymer selected from the class consisting of natural and modified versions of xanthan gum, welan gum, guar gum, dextran gum, locust bean gum, and mixtures thereof;
- mixing said composition to water to form a water-based drilling fluid; and
- drilling said horizontal wellbore while using said drilling fluid to remove drill cuttings from said wellbore.

11. The method according to claim 10, wherein said drilling fluid contains about 20 pounds of composition per 42 gallon barrel of water.

12. The method according to claim 10, wherein said composition mixed with the water comprises about 94–97% by weight of finely divided sodium bentonite, about 2–4% by weight of sodium carbonate and about 1–2% by weight of xanthan gum.

* * * * *